(12) United States Patent
Ihara

(10) Patent No.: US 8,300,879 B2
(45) Date of Patent: Oct. 30, 2012

(54) APPARATUS AND METHOD OF SUPPRESSING DETERIORATION OF DOCUMENT HAVING ENCODED DATA

(75) Inventor: Fujio Ihara, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 761 days.

(21) Appl. No.: 12/468,803

(22) Filed: May 19, 2009

(65) Prior Publication Data

US 2010/0158399 A1  Jun. 24, 2010

(30) Foreign Application Priority Data

Dec. 24, 2008  (JP) ................. 2008-328307

(51) Int. Cl.
 - *G06K 9/00* (2006.01)
 - *G06K 15/00* (2006.01)
 - *H04N 1/40* (2006.01)

(52) U.S. Cl. ...................... 382/100; 358/3.28

(58) Field of Classification Search .................. None
See application file for complete search history.

(56) References Cited

U.S. PATENT DOCUMENTS

2002/0090107 A1* 7/2002 Acharya et al. ............... 382/100
2003/0161498 A1* 8/2003 Oami ............................ 382/100
2004/0036924 A1* 2/2004 Ihara ........................... 358/3.28
2005/0025333 A1* 2/2005 Fujii et al. .................... 382/100
2007/0172096 A1* 7/2007 Komatsubara et al. ....... 382/100
2007/0172123 A1* 7/2007 Komatsubara et al. ....... 382/175

FOREIGN PATENT DOCUMENTS

JP  2007-49588 A  2/2007

* cited by examiner

*Primary Examiner* — Li Liu

(74) *Attorney, Agent, or Firm* — Sughrue Mion, PLLC

(57) ABSTRACT

An image processing apparatus includes an arrangement unit and a restriction unit. The arrangement unit puts images representing codes of an object code string in areas of an object image. The areas correspond to positions of the codes in the object code string. If a first code string and a second code string associated with the first code string are present in the object code string in a certain positional relationship and if satisfied is a condition regarding whether or not codes of the first code string are decodable by a decoder from an image obtained by putting the code images representing the codes of the first code string, which is present in the object code string, the restriction unit restricts the arrangement unit from putting images representing respective codes of the second code string, which is present in the object code string, in the object image.

8 Claims, 10 Drawing Sheets

FIG. 2

| First bit strings | Second bit strings |
|---|---|
| "101" | "10" |
| "111" | "00" |
| ... | ... |

FIG. 3A

| 1 | 2 | 3 | 4 | 5 | 6 | 7 | · · · | e |
|---|---|---|---|---|---|---|---|---|
| 0 | 1 | 0 | 1 | 1 | 0 | 0 | · · · | 0 |

FIG. 3B

| 0 | *1* | *0* | *1* | *1* | *0* | 0 | · · · | 0 |
|---|---|---|---|---|---|---|---|---|

FIG. 3C

| 0 | 1 | 0 | 1 | Z | Z | 0 | · · · | 0 |
|---|---|---|---|---|---|---|---|---|

APPARATUS AND METHOD OF SUPPRESSING DETERIORATION OF DOCUMENT HAVING ENCODED DATA

CROSS-REFERENCE TO RELATED APPLICATIONS

This application is based on and claims priority under 35 USC 119 from Japanese Patent Application No. 2008-328307 filed on Dec. 24, 2008.

BACKGROUND

1. Field of the Invention

The invention relates to an image processing apparatus, an image processing method, a computer-readable medium storing a program and a computer data signal embedded with the program.

2. Related Art

There is a technique to add information as an image. For example, an image of a code of a code string is added to an image to be processed (hereinafter referred to as an "object image"), and the code string is decoded from the image added to the object image for extraction.

SUMMARY

According to an aspect of the invention, an image processing apparatus includes an arrangement unit and a restriction unit. The arrangement unit puts images representing respective codes of an object code string in respective areas of an object image. The respective areas correspond to positions of the codes in the object code string. If a first code string and a second code string associated with the first code string are present in the object code string in a certain positional relationship and if satisfied is a condition regarding whether or not codes of the first code string are decodable by a decoder from an image obtained by putting the code images representing the codes of the first code string, which is present in the object code string, by the arrangement unit, the restriction unit restricts the arrangement unit from putting images representing respective codes of the second code string, which is present in the object code string, in the object image.

According to another aspect of the invention, a computer-readable medium stores a program that causes a computer to function as an arrangement unit and a restriction unit. The arrangement unit puts images representing respective codes of an object code string in respective areas of an object image, the respective areas corresponding to positions of the codes in the object code string. If a first code string and a second code string associated with the first code string are present in the object code string in a certain positional relationship and if satisfied is a condition regarding whether or not codes of the first code string are decodable by a decoder from an image obtained by putting the code images representing the codes of the first code string, which is present in the object code string, by the arrangement unit, the restriction unit restricts the arrangement unit from putting images representing respective codes of the second code string, which is present in the object code string, in the object image.

According to further another aspect of the invention, a computer-readable medium stores a program that causes a computer to function as an image analysis unit, a first decoding unit and a second decoding unit. The image analysis unit analyzes an image of each area in an object image. The first decoding unit decodes each code of an object code string based on a result of analyzing the image of the area corresponding to a position of each code. If there is codes that the first decoding unit has not been able to decode, if a first code string is present in a code string that has been decoded by the first decoding unit, and if the codes, which the first decoding unit has not been able to decode, and the first code string being present in the code string, which has been decoded by the first decoding unit, have a certain positional relationship, the second decoding unit decodes the codes, which the first decoding unit has not been able to decode, based on codes of a second code string associated with the first code string.

The program may be provided through a communication network such as the Internet or may be provided from any of various computer-readable information recording media, such as a flexible disk, a CD-ROM and a DVD-ROM.

Furthermore, the program may be stored in a computer-readable information recording medium. Examples of the information recording medium include, for example, a magnetic tape, a flexible disk, a hard disk, a CD-ROM, an MO, an MD, a DVD-ROM or an IC card.

BRIEF DESCRIPTION OF THE DRAWINGS

Exemplary embodiments of the invention will be described below in detail based on the accompanying drawings, wherein:

FIG. 2 is a diagram illustrating an exemplary table;

FIGS. 3A to 3C are diagrams illustrating exemplary bit strings;

DETAILED DESCRIPTION

[1. Hardware Configuration]

Figure 1:
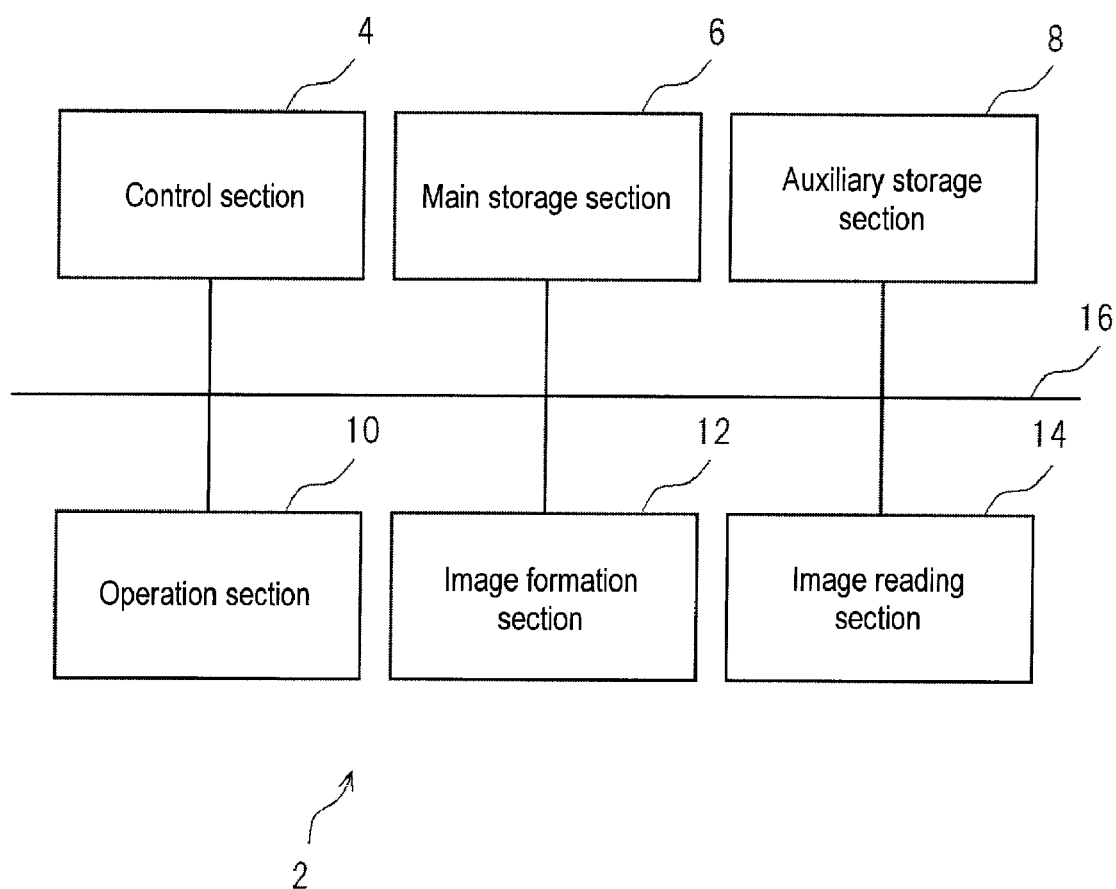
FIG. 1 is a diagram illustrating the hardware configuration of an image processing apparatus according to an exemplary embodiment of the invention.

A preferred embodiment of the invention will now be described with reference to the accompanying drawings. FIG. 1 is a diagram illustrating the hardware configuration of an image processing apparatus 2 according to an exemplary embodiment of the invention. As illustrated in FIG. 1, the image processing apparatus 2 is a computer system including a control section 4, a main storage section 6, an auxiliary storage section 8, an operation section 10, an image formation section 12 and an image reading section 14. The respective sections are connected to one another through buses 16 so that data can be sent/received to/from one another. Also, the image processing apparatus 2 includes a display device, a communication interface and the like which are not shown.

The control section 4 is, for example, a microprocessor. The control section 4 executes information processing in accordance with a program stored in the main storage section 6.

The main storage section 6 is, for example, a RAM. The main storage section 6 stores the program mentioned above. Also, the main storage section 6 stores various data that is required during the information processing.

In this exemplary embodiment, the main storage section 6 stores a table illustrated in FIG. 2. FIG. 2 illustrates an example of this table. As illustrated in FIG. 2, the main storage section 6 includes a first bit string field and a second bit string field. First bit strings (first code strings) are stored in the first bit string field, and second bit strings (second code strings) are stored in the second bit string field. A first bit string and a second bit string are associated with each other. Also, each of first bit strings and second bit strings is a string of bit values of "0" and "1".

The auxiliary storage section 8 is, for example, a hard disk. The auxiliary storage section 8 stores various data. For example, the auxiliary storage section 8 stores documents, user information about users (such as employee ID numbers) and the like.

The operation section 10 is a user interface through which a user performs an input operation. The operation section 10 is, for example, a keyboard or a mouse.

The image formation section 12 is, for example, a printer. The image formation section 12 prints a document stored in the auxiliary storage section 8 on a paper medium in response to an instruction given by a user.

The image reading section 14 is, for example, a scanner. The image reading section 14 scans a document so as to acquire a document image (bitmap data) of the document.

When this image processing apparatus 2 accepts a print directive operation performed by a user, an image (a document image) of a document stored in the auxiliary storage section 8 is printed on a medium. When a document image is printed on a medium, this image processing apparatus 2 converts user information into a bit string (see FIG. 3A) so as to also print a bit image representing each bit value of the bit string on the medium.

Figure 4:
FIG. 4 is a diagram of an exemplary document image with codes.

FIG. 4 is a diagram illustrating an exemplary medium on which a document image has been printed. As illustrated in FIG. 4, not only the document image but also a bit image "/" corresponding to a bit value "1" and a bit image "\" corresponding to a bit value "0" are printed on the medium.

Now, a technique of suppressing such bit images from deteriorating a document image will be described.

[2. Process 1 Executed by Image Processing Apparatus]

Figure 5:
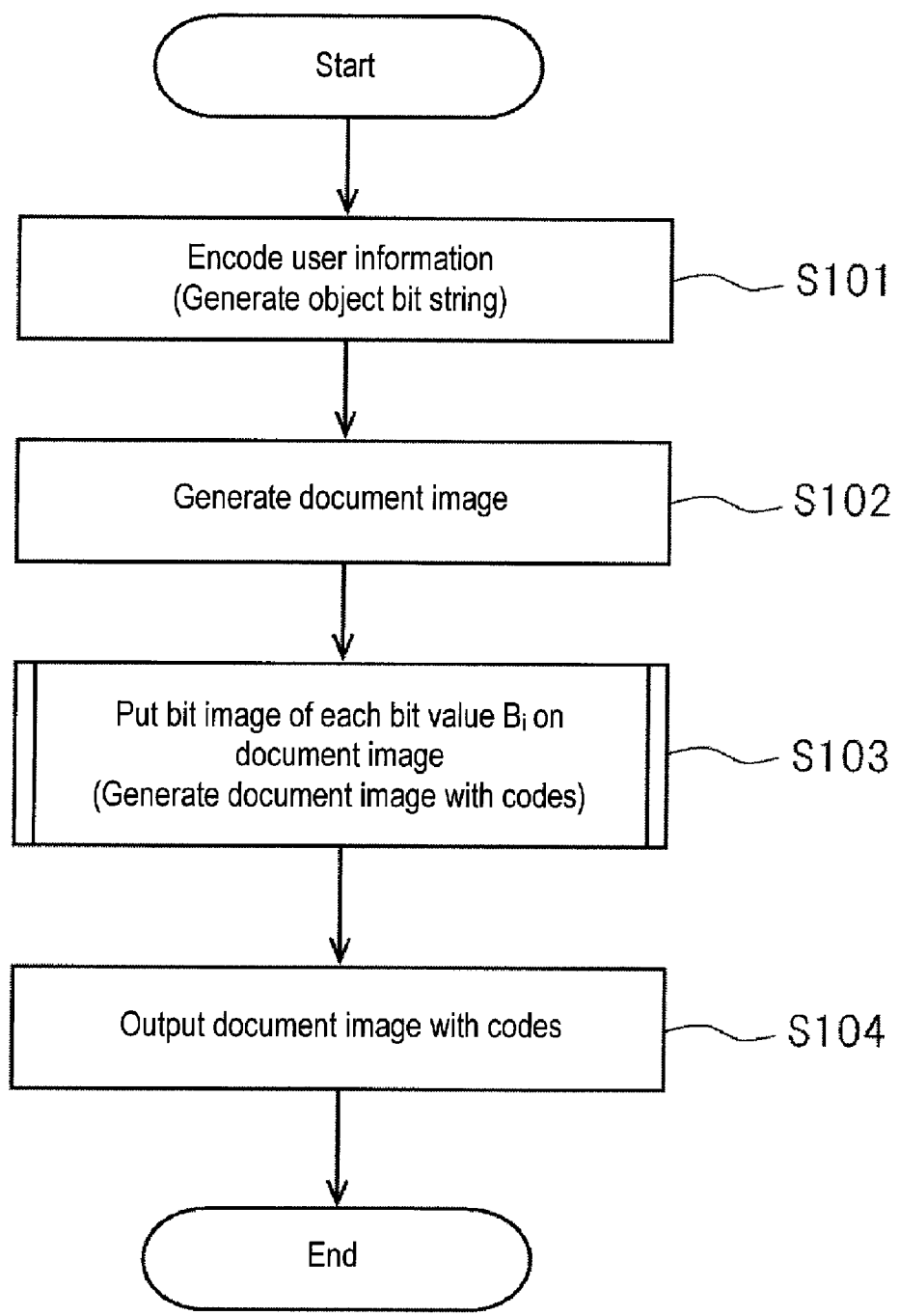
FIG. 5 is a flowchart showing a process executed in the image processing apparatus according to the exemplary embodiment of the invention.

FIG. 5 is a flowchart for an example of a process executed by the image processing apparatus 2. This process is executed by having the control section 4 operate in accordance with the program stored in the main storage section 6. In this exemplary embodiment, this process is executed when the print directive operation is performed.

The control section 4 encodes user information of the user who has performed the print directive operation, so as to generate a bit string (see FIG. 3A) representing the user information (S101). Hereinafter, such a bit string generated in step S101 is referred to as an "object bit string".

It is noted that a number provided above each bit value in FIG. 3A (hereinafter referred to as the "bit number") represents the bit position of the bit value. Hereinafter, a bit position having a bit number "i" is mentioned as a bit position $P_i$.

For example, a bit position $P_1$ corresponds to the bit position having the bit number "1". Also, a bit value located in the bit position $P_i$ is referred to as a bit value $B_i$.

The control section 4 generates a document image (such as bitmap data) that is a document to be printed (S102). This document image corresponds to an "object image".

Figure 6:
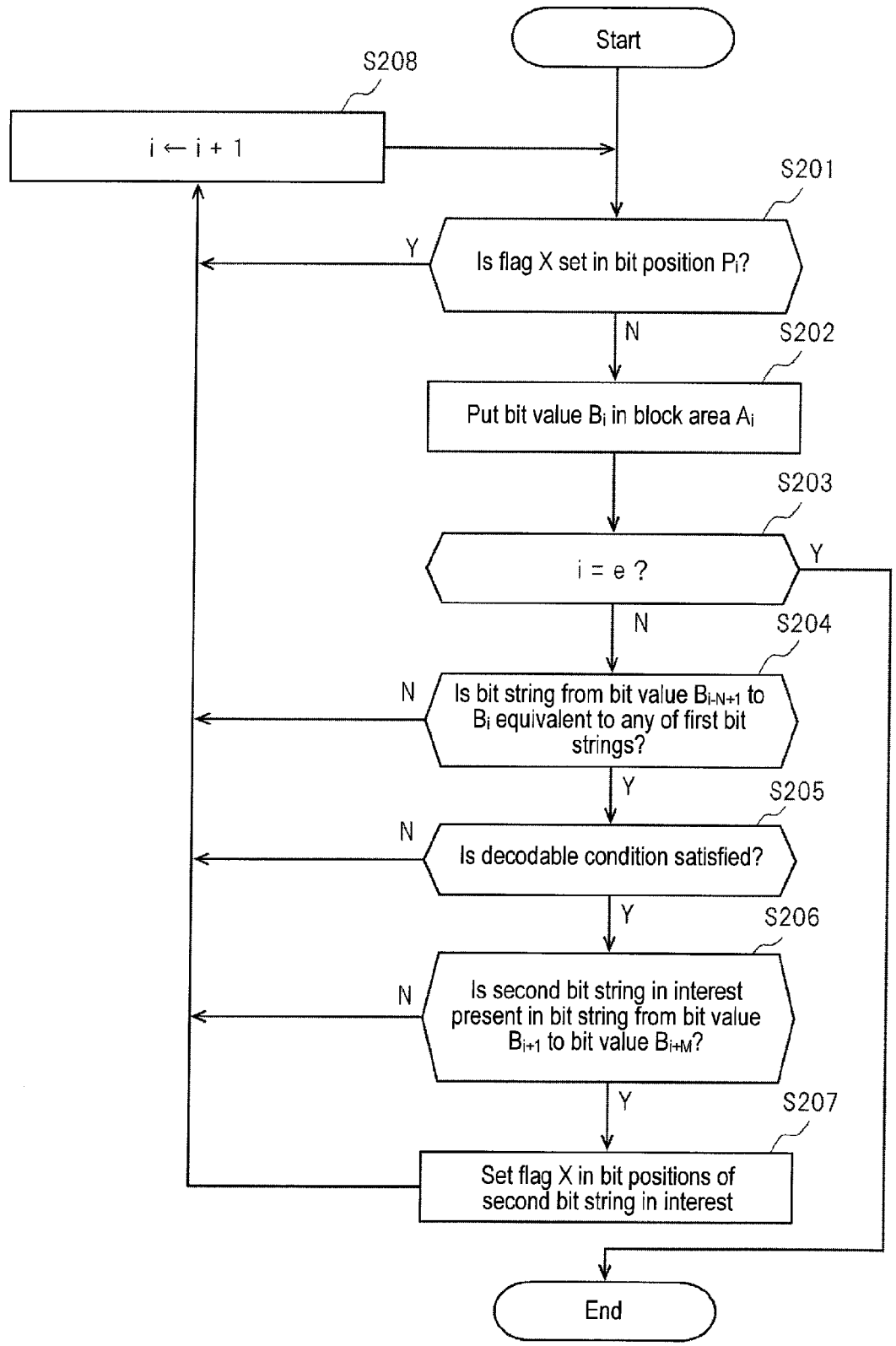
FIG. 6 is a flowchart showing another process executed in the image processing apparatus according to the exemplary embodiment of the invention.

Then, the control section 4 puts a bit image corresponding to each bit value $B_i$ of the object bit string on the document image in a manner illustrated in FIG. 6 (S103). Hereinafter, to "put a bit image corresponding to a bit value $B_i$ on a document image" will be described simply as to "put a bit value $B_i$ on a document image". The control section 4 generates a "document image with codes" by putting every bit value $B_i$ on a document image.

Figure 7:
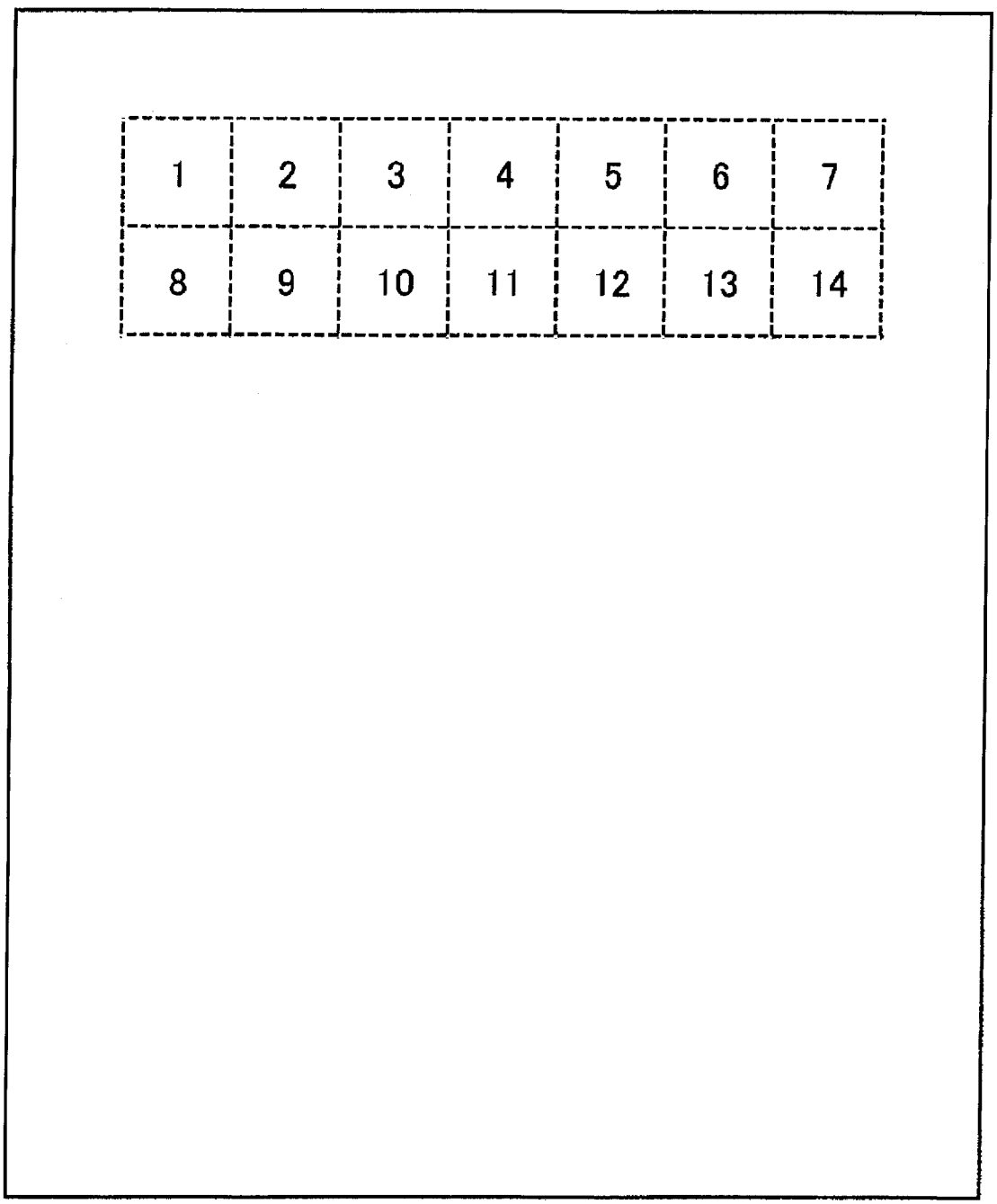
FIG. 7 is a diagram illustrating block areas.

It is noted that an area in a document image where each bit value $B_i$ is to be put (hereinafter referred to as a "block area") is set in advance in the image processing apparatus 2. FIG. 7 is a diagram showing respective block areas. Each cell surrounded with a broken line corresponds to a block area. A number provided within each cell corresponds to a number of that block area (hereinafter referred to as an "area number"). Hereinafter, a block area with an area number "i" is referred to as a block area $A_i$. Each bit value $B_i$ is located in a block area $A_i$.

The flowchart of FIG. 6 will now be described. The control section 4 determines as to whether or not a flag X is set in a bit position $P_i$ (S201). First, the control section 4 determines as to whether or not the flag X is set in the bit position $P_1$.

When the flag X is not set in the bit position $P_i$ (N in S201), the control section 4 (an example of an arrangement unit) puts a bit value $B_i$ in a block area $A_i$ (S202).

Then, the control section 4 determines as to whether or not the bit number i is equal to a bit number e (S203). In other words, the control section 4 determines as to whether or not the bit value $B_i$ is a bit value of the final bit of the object bit string. Herein, "e" represents a number of the final bit of the object bit string.

If the bit number i is the bit number e (Y in S203), the process is terminated. Specifically, the process performed by the control section 4 proceeds to step S1104.

On the other hand, if the bit number i is not the bit number e (N in S203), the control section 4 determines as to whether or not a bit string from a bit value $B_{i-N+1}$, which is put before the bit values $B_i$ by N (for example, N=3) bit values including the bit value $B_i$, to the bit value $B_i$ is equivalent to a first bit string (S204).

If the bit string from the bit value $B_{i-N+1}$ to the bit value $B_i$ is equivalent to any of the first bit strings (Y in S204), the control section 4 determines as to whether or not a decodable condition is satisfied (S205). If the decodable condition is satisfied (Y in S205), the process performed by the control section 4 proceeds to step S206. Hereinafter, a first bit string that is equivalent to the bit string disposed from the bit value $B_{i-N+1}$ to the bit value $B_i$ will be referred to as a "first bit string in interest".

The decodable condition is a condition to be satisfied when all the bit values $B_x$ included in the first bit string in interest can be highly probably decoded from an image (which will be referred to as a "block image with codes") obtained by putting these bit values $B_x$ in block areas $A_x$. Whether or not the decodable condition is satisfied is determined in the following manner.

For example, an overlap degree L indicating how a character image included in a block area $A_x$ and a bit image of a bit value $B_x$ overlap each other is calculated. The overlap degree L is calculated by, for example, dividing "a number N1 of significant pixels (for example, black pixels) included in a binary image of a bit image of a bit value $B_x$" by a difference N4 between "a sum of a number N2 of significant pixels included in a binary image of a block area $A_x$ (namely, a number of pixels included in a character portion) and the number N1 (=N1+N2)" and "a number N3 of significant pixels included in a binary image of a block image with codes" (i.e., N4=N1+N2−N3) (namely, the overlap degree L is calculated as N1/N4). If the overlap degree L is small, namely, if the overlap degree L is equal to or less than a predetermined value TH (for example, 1.5), the process performed by the control section 4 proceeds to step S205. In this example, if the overlap degree L is equal to or less than the value TH, it can be said that the decodable condition is satisfied.

Alternatively, the control section 4 may actually analyze a block image with codes so as to attempt to detect a bit image from the block image with codes. If the control section 4 can actually detect a bit image of a bit value $B_x$ from the block image with codes, the process performed by the control section 4 proceeds to step S205. In this example, if a bit image of a bit value $B_x$ is detected from the block image with codes, it can be said that the decodable condition is satisfied. It is noted that the control section 4 may perform predetermined image processing for the block image with codes before analyzing the block image with codes. For example, the control section 4 may perform a blurring process for the block image with codes. Alternatively, the control section 4 may add noise to the block image with codes by filtering the block image with codes.

In step S206, the control section 4 determines, by referring to the object bit string, whether or not a second bit string associated with the first bit string in interest (such a second bit string will be hereinafter referred to as a "second bit string in interest") is present in a position having a predetermined relationship with the position of the first bit string in interest (S206). If the second bit string in interest is present in the position having the predetermined relationship with the position of the first bit string in interest (Y in S206), the process performed by the control section 4 proceeds to step S207.

In this exemplary embodiment, the control section 4 determines as to whether or not the second bit string in interest is present after the first bit string in interest. More specifically, the control section 4 determines as to whether or not the second bit string in interest is present in a position away, by a predetermined distance, from the final bit position (that is, the bit position $P_i$ in this case) of the first bit string in interest.

Specifically, the control section 4 determines as to whether or not the second bit string in interest is present in a bit string from a bit value $B_{i+1}$ to a bit value $B_{i+M}$, where M denotes a predetermined integer of 1 or more (for example, 3). If the second bit string in interest is present in the bit string from the bit value $B_{i+1}$ to the bit value $B_{i+M}$ (Y in S206), the process performed by the control section 4 proceeds to step S207. In FIG. 3B, for example, assuming that M=N=3, it is determined in step S204 that a first bit string "101" is equivalent to a bit string from a bit value $B_2$ to a bit value $B_4$. Thereafter, it is determined in step S206 as to whether or not a second bit string in interest "10" is present in a bit string disposed from a bit value $B_5$ to a bit value $B_8$. In FIG. 3B, the second bit string in interest "10" is present in the bit string from the bit value $B_5$ to the bit value $B_8$, that is, in "100 . . . ". Therefore, the process performed by the control section 4 proceeds to step S207. If there are plural second bit strings in interest in the bit string from the bit value $B_{i+1}$ to the bit value $B_{i+M}$, the process proceeds to step S207 when a first second bit string in interest is detected.

In step S207, the control section 4 sets the flag X in bit positions of the second bit string in interest. Then, the control section 4 increments "i" by "1" in step S208, and then the process is repeated from step S201.

If the flag X is set in the bit position $P_i$ (Y in S201), if none of the first bit strings is present in the bit string from the bit value $B_{i-N+1}$ to the bit value $B_i$ (N in S204), if the decodable condition is not satisfied (N in S205), or if there is no second bit string in interest in the bit string from the bit value $B_{i+1}$ to the bit value $B_{i+M}$ (N in S206), the process performed by the control section 4 proceeds to step S208, and then the process is repeated from step S201. In the process performed in accordance with the flowchart of FIG. 6, in the example shown in FIG. 3B, a bit image of the bit value $B_5$ and a bit image of the bit value $B_6$ are not respectively put in areas $A_5$ and $A_6$. In other words, no bit image is put in the areas $A_5$ and $A_6$.

In this manner, the document image with codes illustrated in FIG. 4 is generated.

When the document image with codes is generated, the control section 4 outputs the document image with codes (S104). In this exemplary embodiment, the control section 4 prints the document image with codes on a medium.

As described so far, in the image processing apparatus 2, when any of first bit strings and a second bit string associated therewith are present in a predetermined positional relationship in an object bit string, bit values of the second bit string are not put in a document image. Thereby, deterioration of the document image otherwise caused by putting the bit values of the second bit string can be suppressed.

[3. Process 2 Executed by Image Processing Apparatus]

Figure 8:
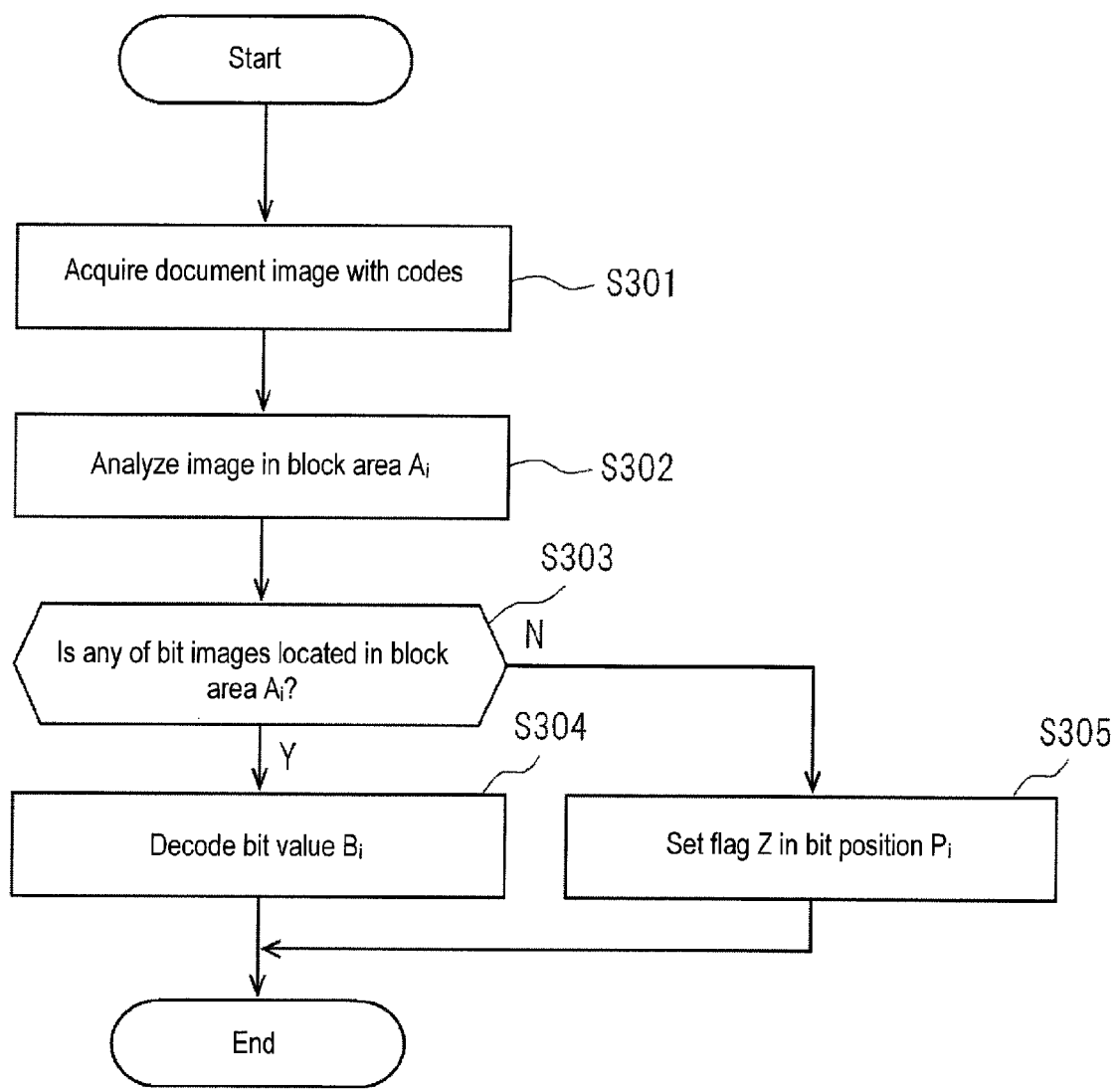
FIG. 8 is a flowchart showing further another process executed in the image processing apparatus according to the exemplary embodiment of the invention.

FIG. 8 is a flowchart illustrating another example of a process executed by the image processing apparatus 2. This process is executed by having the control section 4 operate in accordance with the program stored in the main storage section 6. In this exemplary embodiment, this process is executed when an instruction for reading a medium on which a document image with codes has been printed is given.

In this exemplary embodiment, the control section 4 causes the image reading section 14 to scan the medium, and acquires a document image with codes based on the scan result (S301).

Then, processes from S302 to S305 are executed for every block area.

Specifically, the control section 4 analyzes an image of a block area $A_i$ (S302).

Then, in the steps from S303 to S305, the control section 4 decodes a bit value $B_i$ disposed in a bit position $P_i$ based on the result of the analysis performed in step S302.

Specifically, based on the result of the analysis performed in S302, the control section 4 determines as to whether or not any bit image is located in the block area $A_i$ (S303). In other words, the control section 4 attempts to detect a bit image based on the result of the analysis performed in S302.

If it is determined that any bit image is located in the block area $A_i$ (Y in S303), namely, if a bit image can be detected, the control section 4 decodes a bit value represented by the bit image having been determined to be located in the block area $A_i$ (S304), and sets the decoded bit value as a bit value $B_i$. If it is determined that any bit image is located in the block area $A_i$ (Y in S303), it can be said that the control section 4 has been able to decode the bit value $B_i$ based on the result of the analysis performed in S302.

On the other hand, if it is determined that any bit image is not located in the block area $A_i$ (N in S303), the control section 4 sets a flag Z in the bit position $P_i$ (S305). If it is determined that any bit image is not located in the block area $A_i$ (N in S303), it can be said that the control section 4 has not been able to decode the bit value $B_i$ based on the result of the analysis performed in S302.

Through the processes from S302 to S305, a bit string X as illustrated in FIG. 3C is generated. It is noted that the bit string X illustrated in FIG. 3C is one that is generated in the case where no bit image is located in block areas $A_5$ and $A_6$.

[4. Process 3 Executed by Image Processing Apparatus]

Figure 9:
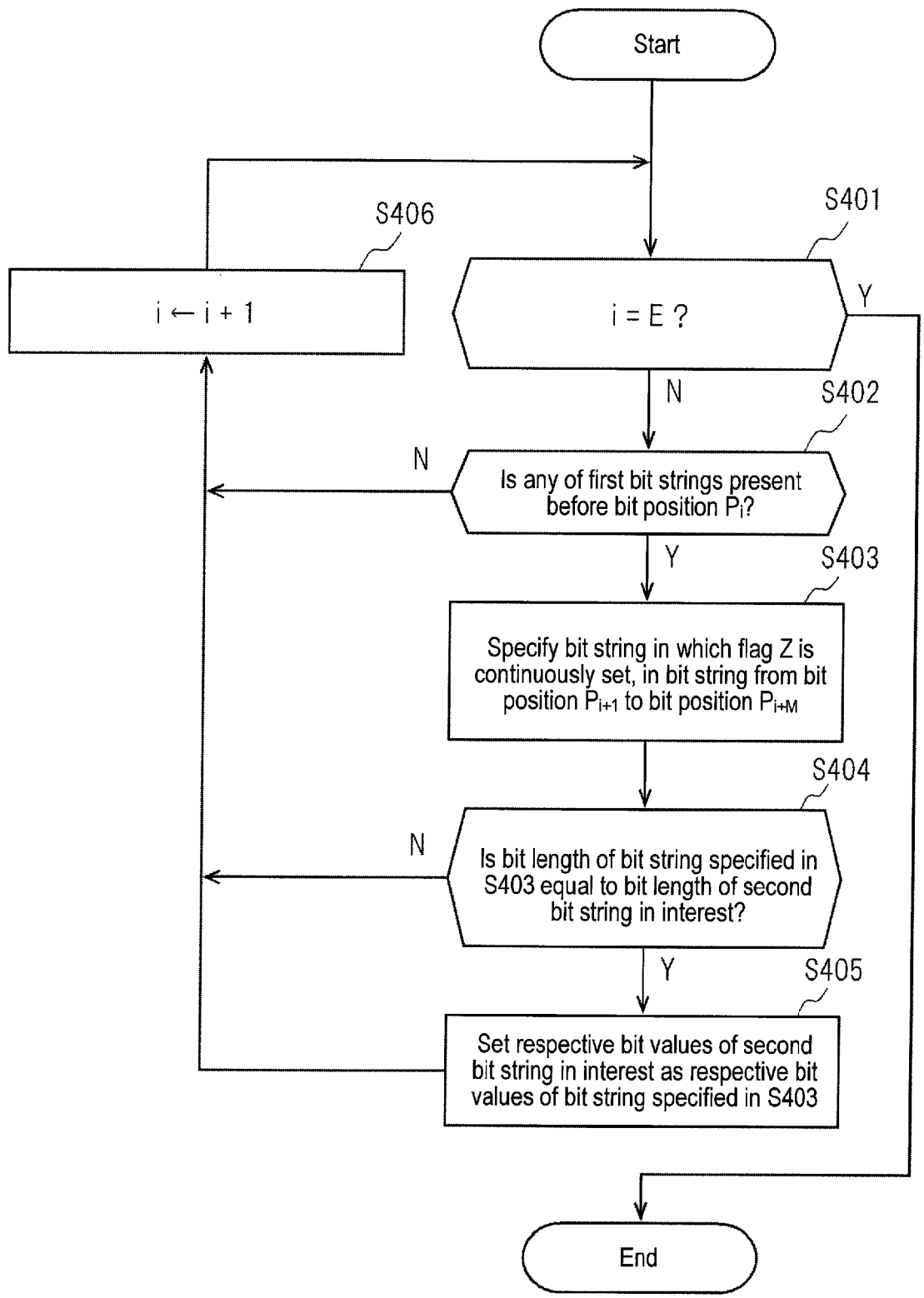
FIG. 9 is a flowchart showing still another processing executed in the image processing apparatus according to the exemplary embodiment of the invention.

FIG. 9 is a flowchart illustrating an example of a process executed by the image processing apparatus 2 when the bit string X is generated. This process is executed by having the control section 4 operate in accordance with the program stored in the main storage section 6.

The control section 4 determines as to whether or not a bit position $P_i$ is a final bit position $P_E$ of a bit string (S401). First, the control section 4 determines as to whether or not a bit position $P_1$ is the final bit position $P_E$.

If the bit position $P_i$ is the final bit position $P_E$ (Y in S401), the control section 4 terminates the process. If the bit position $P_i$ is not the final bit position $P_E$ (N in S401), the process performed by the control section 4 proceeds to step S402.

In step S402, the control section 4 determines as to whether or not any of the first bit strings is present before the bit position $P_i$ by referring to the bit string X. In this exemplary embodiment, the control section 4 determines as to whether or not each first bit string is present before the bit position $P_i$, so as to determine as to whether or not any of the first bit strings is present before the bit position $P_i$.

For example, when the control section 4 is to determine as to whether or not a given first bit string Y is present before the bit position $P_i$, the control section 4 may determine as to whether or not a bit string of N bits from a bit value $B_{i-N+1}$ to a bit value $B_i$ is equivalent to the first bit string Y. If the bit string of N bits from the bit value $B_{i-N+1}$ to the bit value $B_i$ is equivalent to the first bit string Y, the control section 4 determines that the first bit string Y is present before the bit position $P_i$.

If none of the first bit strings is present before the bit position $P_i$ (N in S402), the control section 4 increments "i" by 1 (S406), and the process performed by the control section 4 returns to step S401.

On the other hand, if any of the first bit strings is present before the bit position $P_i$ (Y in S402), the control section 4 determines as to whether or not a flag Z is set in a bit position in a predetermined positional relationship with the first bit string, which is present before the bit position $P_i$ (which first bit string is hereinafter referred to as the "first bit string in interest"). In this exemplary embodiment, the control section 4 determines as to whether or not the flag Z is set in each of bit positions from a bit position $P_{i+1}$ to a bit position $P_{i+M}$, so as to specify a bit string where the flag Z is continuously set in the bit string from the bit position $P_{i+1}$ to the bit position $P_{i+M}$ (S403).

Then, the control section 4 determines as to whether or not the bit length of the bit string specified in step S403 is equal to the bit length of a second bit string stored in association with the first bit string in interest (which second bit string is hereinafter referred to as the "second bit string in interest") (S404).

If the bit length of the bit string specified in step S403 is not equal to the bit length of the second bit string in interest (N in S404), the control section 4 increments "i" by 1 (S406), and the process returns to step S401.

On the other hand, if the bit length of the bit string specified in step S403 is equal to the bit length of the second bit string in interest (Y in S404), the control section 4 decodes respective bit values of the bit string specified in step S403 based on respective bit values of the second bit string in interest (S405). Specifically, the control section 4 sets the respective bit values of the second bit string in interest as the respective bit values of the bit string specified in step S403. Thus, the control section 4 decodes the object bit string.

Assuming that "i" is, for example, 4, the control section 4 determines in step S402 that a first bit string in interest "101" is present before the bit position $P_4$. Also, the control section 4 specifies, in step S403, a bit string including a bit position $P_5$ and a bit position $P_6$. In this case, the bit length of the bit string specified in step S403 and the bit length of a second bit string in interest "10" are both "2", and therefore, the control section 4 decodes, in step S405, the respective bit values of the bit positions $P_5$ and $P_6$ based on the respective bit values of the second bit string in interest. As a result, the object bit string of FIG. 3A is decoded from the bit string X of FIG. 3C.

After step S405, the process performed by the control section 4 proceeds to step S406.

In this manner, in the image processing apparatus 2, a bit value can be decoded without intentionally putting the bit value in a document image. Therefore, the accuracy in decoding an object code string is maintained.

[5. Functional Block 1]

Figure 10:
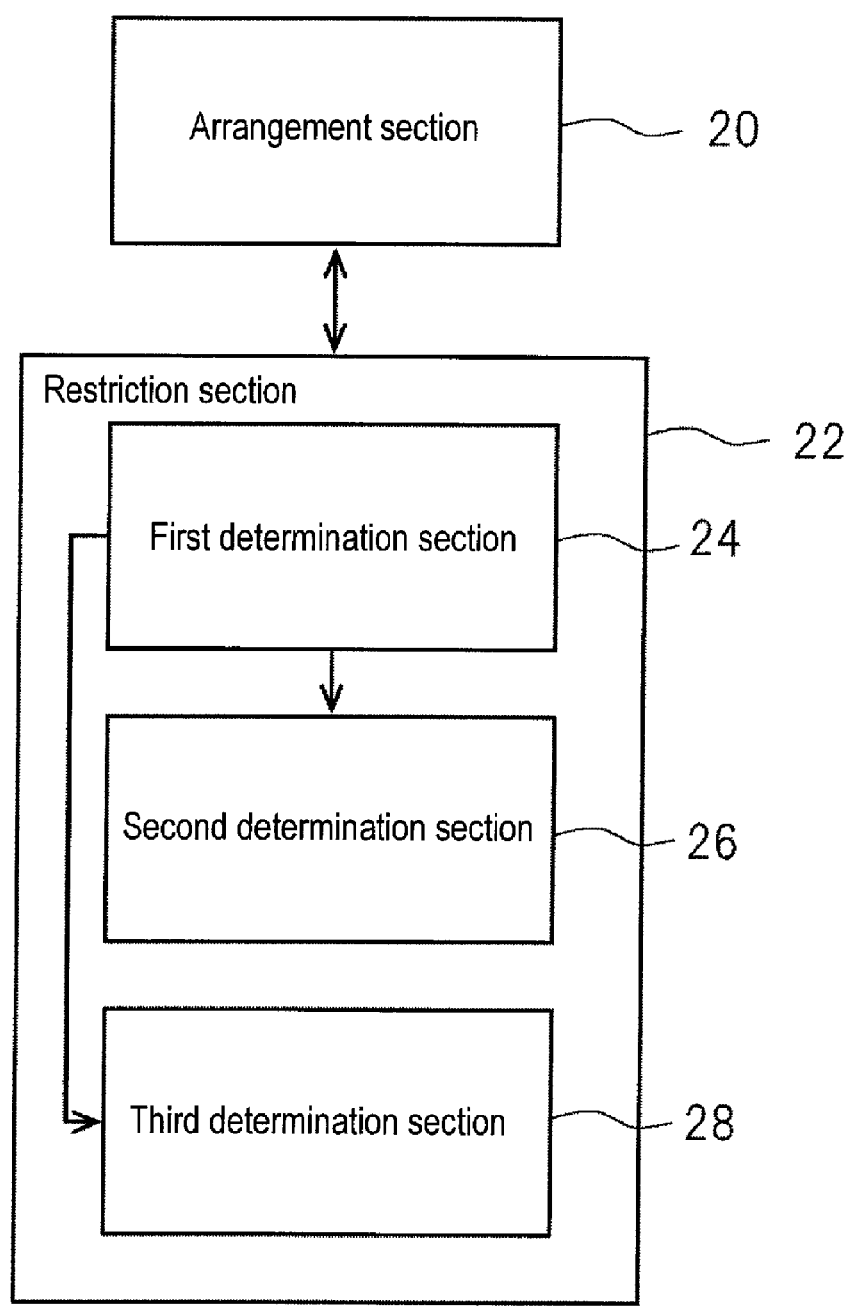
FIG. 10 is a functional block diagram illustrating functions realized by the image processing apparatus according to the exemplary embodiment of the invention.

FIG. 10 is a functional block diagram illustrating functions relating to restriction in putting a second bit string in interest out of functions realized by the image processing apparatus 2. As illustrated in FIG. 10, the image processing apparatus 2 includes, as its functions, an arrangement section 20 and a restriction section 22. The restriction section 22 includes a first determination section 24, a second determination section 26 and a third determination section 28. These functions are realized by having the control section 4 operate in accordance with the aforementioned program.

[Arrangement Section]

The arrangement section 20 is realized mainly by the control section 4. The arrangement section 20 puts a bit image of a bit value $B_i$ of an object bit string in a block area $A_i$ of a document image corresponding to a bit position $P_i$ of the bit value $B_i$ (in S202 of FIG. 6).

[Restriction Section]

The restriction section 22 is realized mainly by the control section 4. If any of the first bit strings and a second bit string associated therewith are present in the predetermined positional relationship in an object bit string and if the aforementioned decodable condition is satisfied, the restriction section 22 restricts the arrangement section 20 from putting bit images of respective bit values of the second bit string (that is, the second bit string in interest) present in the object bit string (see steps S204 through S207 and S201 of FIG. 6).

[First Determination Section]

Specifically, the first determination section 24 first determines as to whether or not any of the first bit strings is present in the object bit string (S204 of FIG. 6).

[Second Determination Section]

If the first determination section 24 determines that any of the first bit strings is present in the object bit string, the second determination section 26 determines as to whether or not the decodable condition is satisfied (S205 of FIG. 6).

[Third Determination Section]

Also, if the first determination section 24 determines that any of the first bit strings is present in the object bit string, the third determination section 28 determines as to whether or not the second bit string associated with the first bit string (which second bit string is hereinafter referred to as the "second bit string in interest") determined to be present in the object bit string (which first bit string is hereinafter referred to as the "first bit string in interest") is present in a position having the predetermined relationship with the position of the first bit string in interest (S206 of FIG. 6).

If the second determination section 26 determines that the decodable condition is satisfied and if the third determination section 28 determines that the second bit string in interest is present in the position having the predetermined relationship with the position of the first bit string in interest, the restriction section 22 restricts the arrangement section 20 from putting bit images of the respective bit values of the second bit string in interest (S207 and S201 of FIG. 6).

In the description given so far, after the first determination section 24 first detects any of the first bit strings (namely, a first bit string in interest) in an object bit string, the third determination section 28 determines as to whether or not a second bit string associated with the first bit string in interest (namely, a second bit string in interest) is present in a position having the predetermined relationship with the position of the first bit string in interest.

Instead, the third determination section 28 may first determine as to whether or not any of second bit strings is present in the object bit string. Thereafter, if the third determination section 28 determines that any of the second bit strings is present in the object bit string, the first determination section 24 may determine as to whether or not a first bit string (a first bit string in interest) associated with the second bit string, which has been determined to be present in the object bit string by the third determination section 28 (namely, the second bit string in interest), is present in a position having a predetermined relationship with the position of the second bit string in interest.

[6. Functional Block 2]

Figure 11:
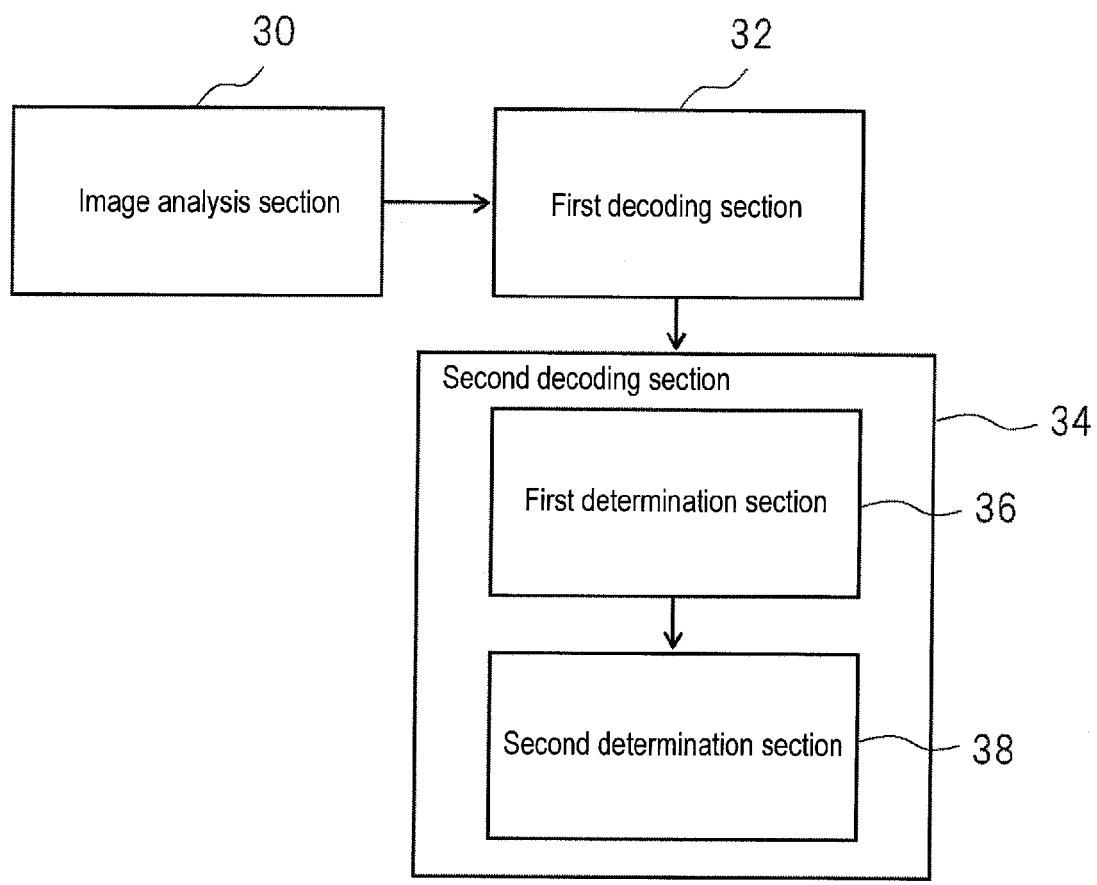
FIG. 11 is a functional block diagram illustrating other functions realized by the image processing apparatus according to the exemplary embodiment of the invention.

FIG. 11 is a functional block diagram illustrating functions relating to decoding of an object bit string from a document image with codes, out of all the functions realized by the image processing apparatus 2. As illustrated in FIG. 1, the image processing apparatus 2 includes, as its functions, an image analysis section 30, a first decoding section 32 and a second decoding section 34. The second decoding section 34 includes a first determination section 36 and a second determination section 38. These functions are realized by having the control section 4 operate in accordance with the aforementioned program.

[Image Analysis Section]

The image analysis section 30 is realized mainly by the control section 4. The image analysis section 30 analyzes images of respective block areas of a document image with codes (S302 of FIG. 8).

[First Decoding Section]

The first decoding section 32 is realized mainly by the control section 4. The first decoding section 32 decodes each bit value $B_i$ of an object bit string based on the result of analysis of a block area $A_i$ corresponding to a bit position $P_i$ of the bit value $B_i$.

In this exemplary embodiment, in decoding a bit value $B_x$ located in a given bit position $P_x$, the first decoding section 32 determines as to whether or not any bit image is located in a block area $A_i$ based on the result of the analysis of an image of a block area $A_x$ (S303 of FIG. 8).

If it is determined that any bit image is located in the block area $A_i$, the first decoding section 32 sets a bit value represented by the bit image located in the block area $A_i$ as the bit value $B_x$ (S304 of FIG. 8). Thus, the first decoding section 32 decodes the bit value $B_x$ located in the bit position $P_x$. In this case, it can be said that the first decoding section 32 has been able to decode the bit value $B_x$ located in the bit position $P_x$.

On the other hand, if it is determined that any bit image is not located in the block area $A_i$, the first decoding section 32 sets a flag Z in the bit position $P_x$ (S305 of FIG. 8). In this case, it can be said that the first decoding section 32 has not been able to decode the bit value $B_x$ based on the analysis result of the image of the block area $A_x$.

[Second Decoding Section]

The second decoding section 34 is realized mainly by the control section 4. If there is a bit value that has not been able to be decoded by the first decoding section 32, if any of first bit strings is present in a bit string having been decoded by the first decoding section 32 and if the bit value that has not been able to be decoded by the first decoding section 32 and the first bit string present in the bit string having been decoded by the first decoding section 32 (namely, the first bit string in interest) are in a predetermined positional relationship, the second decoding section 34 decodes the bit value that has not been able to be decoded by the first decoding section 32 based on a code of a second bit string associated with the first bit string in interest (namely, a second bit string in interest) (see FIG. 9).

[First Determination Section]

Specifically, the first determination section 36 first determines as to whether or not any of first bit strings is present in a bit string having been decoded by the first decoding section 32 (S402 of FIG. 9).

[Second Determination Section]

If the first determination section 36 determines that any of the first bit strings is present in the bit string having been decoded by the first decoding section 32, the second determination section 38 determines as to whether or not the bit value $B_x$ that has not been able to be decoded by the first decoding section 32 is present in a position having a predetermined positional relationship with the first bit string present in the bit string having been decoded by the first decoding section 32 (namely, the first bit string in interest) (S403 of FIG. 9).

If the second determination section 38 determines that the bit value $B_x$ that has not been able to be decoded by the first decoding section 32 is present in the position having the predetermined positional relationship with the first bit string in interest, the second decoding section 34 decodes the bit value $B_x$ based on a bit value of a second bit string associated with the first bit string in interest (namely, a second bit string in interest) (S405 of FIG. 9).

In the description given so far, after the first determination section 36 first detects a first bit string present in a bit string having been decoded by the first decoding section 32 (which first bit string is hereinafter referred to as the first bit string in interest), the second determination section 38 determines as to whether or not a bit value $B_x$ that has not been able to be decoded by the first decoding section 32 is present in a position having a predetermined positional relationship with the first bit string in interest.

Instead, the second determination section 38 may first determine as to whether or not a bit value $B_x$ that has not been able to be decoded by the first decoding section 32 is present. Thereafter, if the second determination section 38 determines that the bit value $B_x$ that has not been able to be decoded by the first decoding section 32 is present, the first determination section 36 may determine as to whether or not any of first bit strings is present in a bit string that has been decoded by the first decoding section 32 and is in a predetermined positional relationship with the bit value $B_x$. In this case, if the first determination section 36 determines that any of first bit strings is present in the bit string that has been decoded by the first decoding section 32 and is in the predetermined positional relationship with the bit value $B_x$, the second decoding section 34 decodes the bit value $B_x$ based on a bit value of a second bit string (a second bit string in interest) associated with the first bit string present in the bit string (namely, the first bit string in interest).

[7. Alternatives]

The invention is not limited to the above-described exemplary embodiments.

Figure 12:
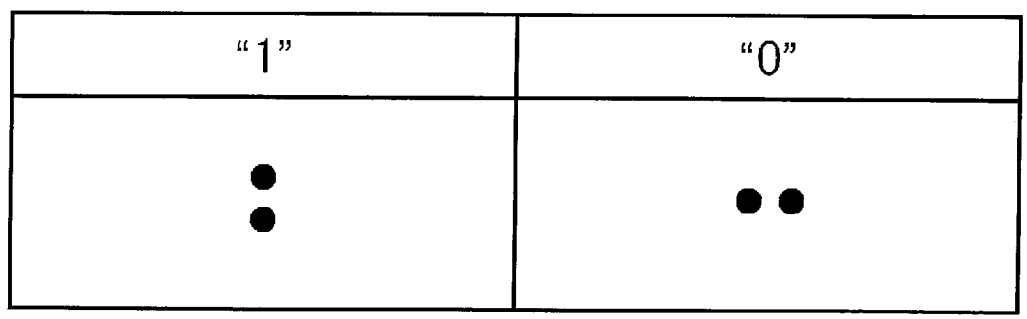
FIG. 12 is a diagram illustrating exemplary bit images.

For example, the bit images are not limited to "/" and "\" illustrated in FIG. 4. The bit images may be, for example, images of dot codes as illustrated in FIG. 12.

What is claimed is:

1. An image processing apparatus comprising:
   an arrangement unit that inserts images representing respective codes of an object code string in respective areas of an object image, the respective areas corresponding to positions of the codes in the object code string; and
   a restriction unit, wherein if (i) a first code string and a second code string associated with the first code string are present in the object code string in a certain positional relationship and (ii) a decoder is able to decode an image of the first code string from the object image, the restriction unit restricts the arrangement unit from inserting an image of the second code string in the object image.

2. The image processing apparatus according to claim 1, further comprising:
   an image analysis unit that analyzes the respective areas of the object image;
   a first decoding unit that decodes each code of the object code string based on a result of the image analysis unit; and
   a second decoding unit, wherein if (i) there exists indeterminable codes that the first decoding unit has been unable to decode, (ii) the first code string has been decoded by the first decoding unit, and (ii) the indeterminable codes and the first code string have the certain positional relationship, the second decoding unit decodes the indeterminable codes based on the second code string.

3. The image processing apparatus according to claim 1, wherein if the second code string associated with the first code string is present in the object code string, the restriction unit restricts the arrangement unit from inserting the image of the second code string.

4. The image processing apparatus according to claim 1, wherein if the second code string associated with the first code string is present after the first code string, the restriction unit restricts the arrangement unit from inserting the image of the second code string.

5. A non-transitory computer-readable medium storing a program that causes a computer to function as:
   an arrangement unit that inserts images representing respective codes of an object code string in respective areas of an object image, the respective areas corresponding to positions of the codes in the object code string; and
   a restriction unit, wherein if (i) a first code string and a second code string associated with the first code string are present in the object code string in a certain positional relationship and (ii) a decoder is able to decode an image of the first code string from the object image, the restriction unit restricts the arrangement unit from inserting an image of the second code string, in the object image.

6. The non-transitory computer-readable medium according to claim 5, wherein if the second code string associated with the first code string is present in the object code string, the restriction unit restricts the arrangement unit from inserting the image of the second code string.

7. The non-transitory computer-readable medium according to claim 5, wherein if the second code string associated with the first code string is present after the first code string, the restriction unit restricts the arrangement unit from inserting the image of the second code string.

8. A non-transitory computer-readable medium storing a program that causes a computer to function as:
   an image analysis unit that analyzes image areas of an object image;
   a first decoding unit that decodes an object code string from the analyzed image areas codes; and
   a second decoding unit, wherein if (i) there exists indeterminable codes that the first decoding unit has been unable to decode, (ii) a first code string is present in the decoded object code string, and (iii) the indeterminable codes and the first code string have a certain positional relationship, the second decoding unit decodes the indeterminable codes based on codes of a second code string associated with the first code string.

* * * * *